April 16, 1957     W. C. HUEBNER     2,788,709
ADJUSTING LENS MEANS FOR CAMERAS.

Filed April 7, 1953     2 Sheets-Sheet 1

INVENTOR.
WILLIAM C. HUEBNER
BY
ATTORNEYS

United States Patent Office 2,788,709
Patented Apr. 16, 1957

2,788,709
ADJUSTING LENS MEANS FOR CAMERAS
William C. Huebner, New Rochelle, N. Y.
Application April 7, 1953, Serial No. 347,201
9 Claims. (Cl. 88—57)

This invention relates to a lens, and more particularly to a combination lens which can be used either as a non-reversing or as an image reversing lens in a camera such as a straight line camera used in photomechanical processes for making printing plates.

An object of the invention is to provide a combination lens for a camera and which can be readily changed from a non-reversing lens to an image reversing lens or vice versa without the necessity of removing the lens barrel from the lens board of the camera.

A further object is to provide a combination lens as referred to in the preceding object and wherein the lens barrel does not have to be taken apart in the conversion of the lens from a non-reversing one to a reversing one or vice versa.

A further object is to provide a combination lens such as previously referred to and which includes means for adjusting the nodal point distance between the lens elements of the lens system easily, readily and efficiently when the lens is changed from a non-reversing lens to an image reversing lens and vice versa.

A still further object of the invention is to provide an improved reversing lens element for the lens system of a camera lens and which lens element passes adequate light and hence enables the camera to function with shorter exposure periods.

Another object is to provide a combination lens system and image reverser in which the image reverser is arranged to occupy the space between the lens elements of the lens system but is capable of being readily removed as a unit and a diaphragm unit substituted therefor.

A further object is to provide a combination lens and image reverser so constructed as to prevent the entrance of undesired light rays to the interior of the lens barrel which might produce ghost images during exposure.

Figure 1:
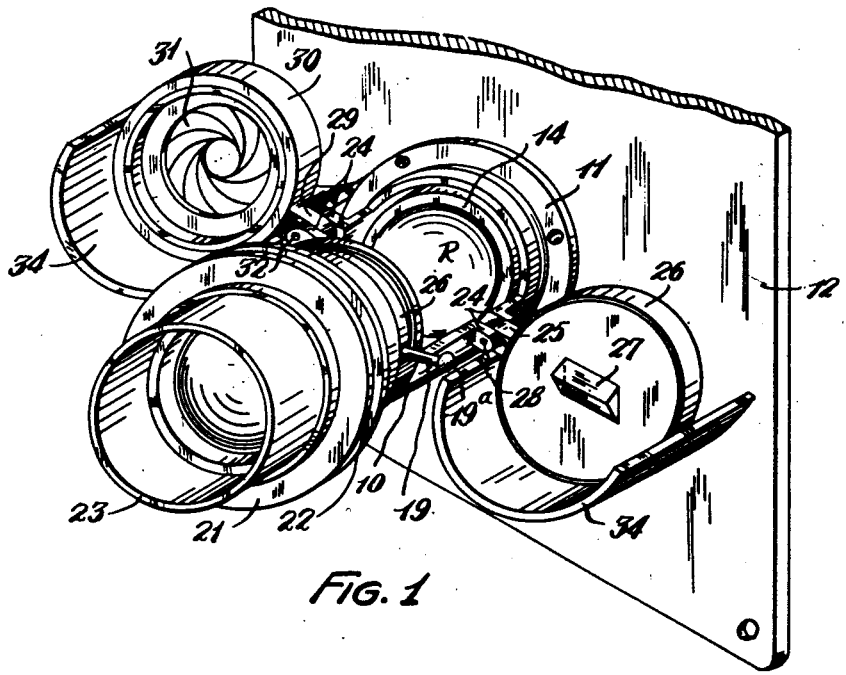

Further and additional objects and advantages residing or inherent in the invention will become apparent hereinafter during the detailed description of an embodiment of the invention which is to follow and which embodiment is illustrated in the accompanying drawing forming part of this description and wherein, Fig. 1 is an isometric perspective view looking from the front end of the lens and with the movable diaphragm unit and the movable reversing lens element unit both swung to their outermost or inoperative positions externally of the lens barrel or casing and at diametrically opposite sides thereof.

Figure 2:
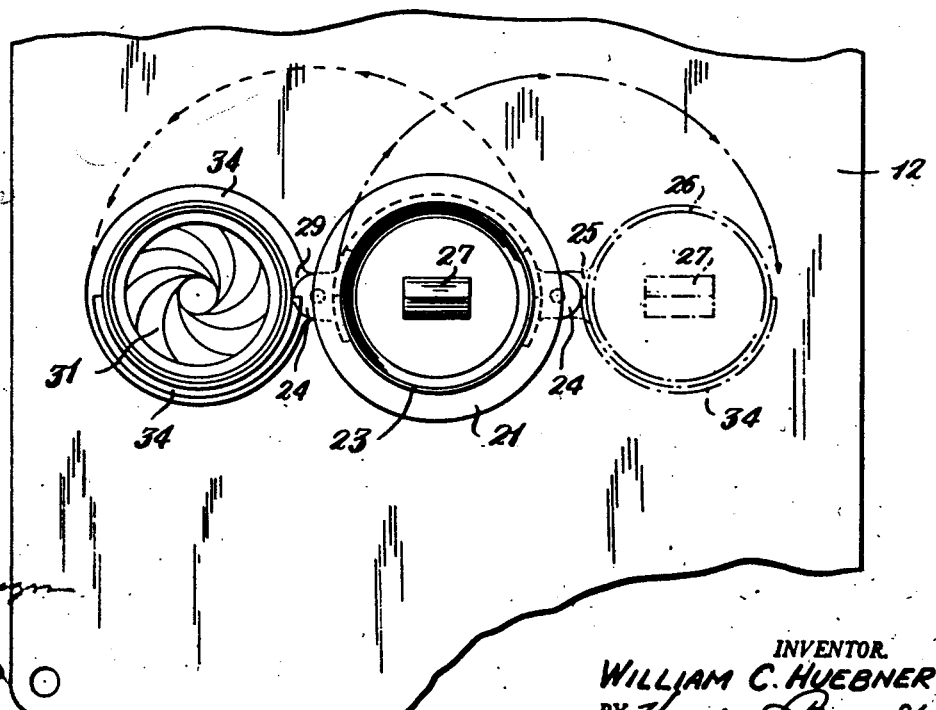

Fig. 2 is a front elevational view of the lens shown in Fig. 1 with the reversing lens element unit being indicated by full lines in its operative position in the lens barrel on the optical axis of the lens and by dash lines in its inoperative position externally at one side of the lens barrel, the diaphragm unit being indicated by full lines in its inoperative position at one side and externally of the lens barrel.

Figure 3:
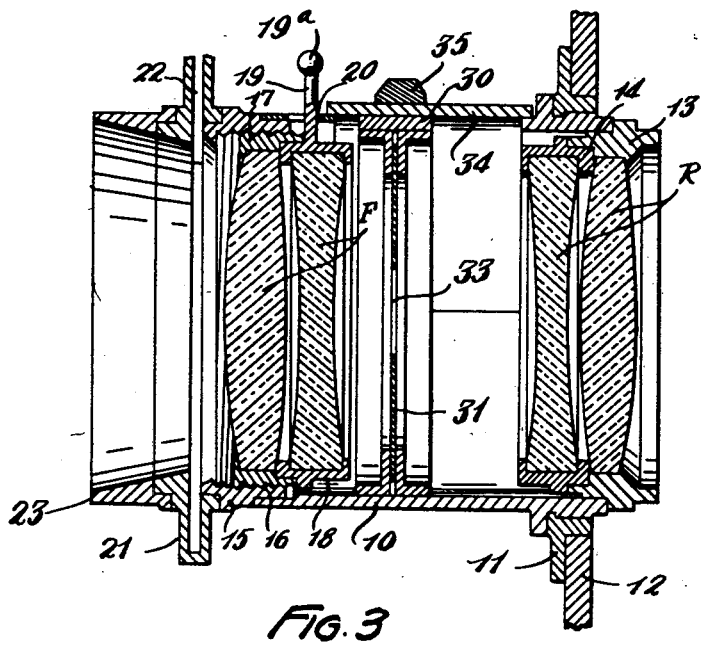
Figure 4:
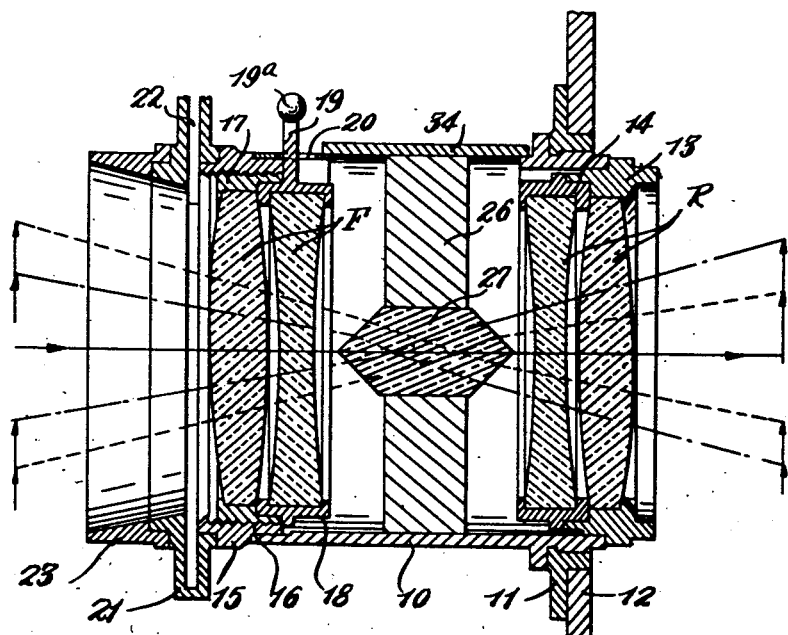

Fig. 3 is a longitudinal section through the lens shown in Figs. 1 and 2 with the diaphragm unit shown in its operative position on the optical axis of the lens and which it occupies when the lens is used as a non-reversing lens, and Fig. 4 is a view similar to Fig. 3 but with the reversing lens element unit in its operative position in the lens barrel when the lens is being used as a reversing lens, at which time the nodal point distance has been corrected from the nodal point distance in the lens as constituted in Fig. 3.

The invention is shown for illustrative purposes as embodied in the lens system of the type used in the lenses of cameras employed for straight line work in which the center of the copy and the center of the sensitized plate upon which the image is projected are in the axial center line of the lens system.

The lens barrel or casing comprises a cylindrical member 10 which at its right hand end as viewed in Figs. 3 and 4 supports and is interlocked with an annular or ring-like attaching member 11 that interfits with an opening in the lens board 12 of the camera. The ring 11 has an annular flange that may be secured to the lens board 12 of the camera by any suitable means such as the screws shown in Fig. 1. The cylindrical member 10 at its lens board end supports an annular lens supporting member 13 which extends into the interior of the cylinder 10 and has connected to it a second annular lens supporting member 14. The annular member 13 may be connected to the cylinder 10 by any suitable means such as screw threads, press fitted or the like, and a similar connection may be effected between the annular member 13 and the annular member 14. The members 13 and 14 support the lenses constituting the rear lens group of the lens system and indicated herein as lens group R.

The front or left hand end of the lens cylinder 10, as viewed in Figs. 3 and 4, is rigidly connected to a ring 15 that extends within the cylinder 10. The ring 15 on its inner circumference is provided with screw threads 16 which are shown as having a fast pitch for a reason later to be explained.

A lens supporting ring or member 17 provided on its external circumference with screw threads is adjustably screwed into the ring 15 for a purpose later to be explained. The ring or member 17 adjacent its inner end has rigidly connected to it in concentric relationship a second lens supporting ring or member 18. The rings or members 17 and 18 mount and support the lenses constituting the front lens group F of the lens system. The ring or member 18 is provided with a lever arm 19 extending radially outwardly of the barrel or casing through an arcuate slot 20 formed therein and the lever 19 is provided on its outer end with an operating knob 19a.

It will be seen that movement of the lever 19 arcuately in the slot 20 causes a rotation of the rings or members 18 and 17 as a unit and since the member 17 is interconnected with the ring 15 by the fast pitch threaded connection such movement will cause the rings or members 17 and 18 to move as a unit toward and away from the rear lens group R to adjust the nodal point distance as will later be explained. The arcuate length of the slot 20 will be correlated to the lineal distance that the front lens group F must be moved to properly adjust the nodal point distance, it being understood of course that the thread pitch of the thread 16 likewise is selected so as to effect the proper adjusting movement. The width of the slot 20 is correlated to the maximum distance of the lineal adjusting movement that is given to the front lens group F and reference to Fig. 3 will show that the lever 19 is near the right hand side of the slot 20 and that the front lens group F has been adjusted for a nodal point distance that is proper for non-reversing or normal use of the lens system while in Fig. 4 the lever 19 is near the left hand side of the slot 20 and the front lens group F has been adjusted for a nodal point distance proper for the use of the lens system with the image reversing lens element moved into operative position within the lens barrel or casing.

The ring 15 has secured to its front or left hand end as viewed in Figs. 3 and 4, an annular member 21 of greater external diameter than the cylinder 10 and ring 15 and provided with a slot 22, wherefore a filter, diaphragm or the like may be positioned in the member 21. The member 21 at its outer end mounts a hood 23 and said member 21 and hood 23 are provided with a divergent outwardly tapered bore therethrough, the center of which coincides with the optical axis of the lens system.

The cylinder 10 of the lens barrel intermediate the front and rear lens groups F and R and on the upper side of the barrel is cut away to form an opening extending longitudinally of the lens barrel and substantially 180° of its circumference. The barrel 10 at diametrically opposite points and on the cutaway longitudinal edges forming the opening referred to is provided with pairs of parallel radially outwardly extending spaced lugs 24. The lugs 24 at one side receive therebetween a connecting projection 25 that extends radially outwardly from the supporting disk 26 which mounts the image reversing element 27. A pivot pin 28 pivotally connects the projection 25 with the lugs 24 and extends through aligned openings in the lugs and in said projection and constitutes the pivotal axis about which the disk 26 can be swung and which axis extends longitudinally of the lens barrel and is parallel to the lens axis.

A similar connecting projection 29 extends radially outwardly from the circumference of the supporting ring 30 that mounts within it the diaphragm 31. The connecting projection 29 extends between the other pair of parallel lugs or ears 24 and is pivotally connected thereto by a pivot pin 32 similar to the pivot pin 28.

It will be seen that the diaphragm supporting ring 30 or the image reversing element supporting disk 26 can be swung upwardly and into the lens barrel from its inoperative position shown in Fig. 1 and along the arcuate path indicated in Fig. 2 by the arrowed dash lines. When the diaphragm 31 or the disk 26 is thus positioned operatively in the lens barrel the opening 33 in the diaphragm and the image reversing element 27 will have their centers located on the optical axis of the lens system and intermediate the nodal points of the front and rear lens groups. The disk 26 and the ring 30 each has secured to it an arcuate segmental cover plate 34 which functions to close the opening in the barrel 10 to exclude undesirable light from the interior of the barrel which might produce ghost images during exposure. It will be understood that the diaphragm 31 will be provided with a suitable control as indicated at 35.

The image reversing lens element 27 is shown as a double prism and this enables the obtainance of double the amount of light during exposure thus reducing the time of exposure as compared to the time required if a single prism were employed. The provision of the double prism as stated furnishes greater light action and hence improves the resolution of the image avoiding astigmatism therein.

As already stated, Fig. 3 shows the lens as set up for normal or non-reversing operation, at which time the diaphragm 31 has been swung to operative position within the lens barrel while the disk 26 carrying the image reversing element 27 is in its inoperative position at one side of the barrel and externally thereof.

Fig. 3 illustrates the adjustment of the front lens group F to provide the correct nodal point distance as determined by the curvatures of the front and rear lens groups for a given dimension in order that the lens will function properly for resolution and even coverage.

Now assuming it is desired to use the lens as an image reversing lens, then the diaphragm 31 is swung outwardly of the lens barrel from its operative position shown in Fig. 3 to its inoperative position shown in Figs. 1 and 2. When this has been done the disk 26 is swung from its inoperative position outside the lens casing shown in Fig. 1, and in Fig. 2 by dot and dash lines to its operative position within the lens barrel as indicated in Figs. 2 and 4.

The reversing element 27 is now located at the optical axis of the lens system and in the space between nodal points between the front and rear lens groups. The image entering the front lens group is deflected by reason of the angles of the prism as indicated by the dot and dash lines and by dash lines in Fig. 4, which clearly show how the image enters the prism and how it emerges therefrom into the rear lens element. The insertion of the reversing prism into the optical axis of the lens system necessitates an adjustment of the nodal point distance from the nodal point distance employed when the lens is used in its normal operation. Consequently the lever 19 is moved in the arcuate slot 20 to cause unitary movement of the front lens group toward the front of the lens, such movement being from the position shown in Fig. 3 to the position shown in Fig. 4.

It will be recalled that rocking of the lever 19 causes the lens supporting members 17 and 18 to rotate as a unit and to move linearly in the lens barrel due to the threaded connection between the supporting ring 17 and the ring 15, it being recalled that a fast pitch thread is provided to enable sufficient linear movement to be imparted to the front lens group without the necessity of excessively rocking or swinging the lever 19 through an extended arc.

Although a preferred embodiment of the invention has been illustrated and described herein it will be understood that the invention is susceptible of various modifications and adaptations within the scope of the appended claims.

Having thus described my invention, I claim:

1. In a lens for a camera including a lens barrel and a lens system therein having front and rear lens groups spaced apart longitudinally of the barrel; the improvement which comprises said barrel having an opening intermediate the lens group, exposing the interior of said barrel to light and a diaphragm unit and an image reversing unit each being independently pivotally connected to said barrel exteriorly thereof and adjacent to said opening to be swung selectively and alternately from exteriorly of the barrel into the latter through said opening and located in the optical axis of the lens system intermediate the front and rear lens groups, said diaphragm unit and said image reversing unit each being defined to close the opening in the barrel to light upon being swung into same.

2. The improvement defined in claim 1 and wherein means is provided for relatively adjusting the front and rear lens groups toward and from each other along the optical axis of the lens system to vary the nodal point distance to the correct one for the use of the diaphragm unit and the use of the image reversing unit.

3. The improvement defined in claim 2 and wherein the means for relatively adjusting the front and rear lens groups includes a segmental slot in said barrel of predetermined length and width and an actuating member extending through said slot to the exterior of said barrel.

4. The improvement defined in claim 1 and wherein the image reversing unit includes a double prism.

5. The improvement defined in claim 4 and wherein means is provided for relatively adjusting the front and rear lens groups along the optical axis of the lens system toward and from each other to vary the nodal point distance for the use of the diaphragm unit and the use of the image reversing unit.

6. In a lens for a camera including a lens barrel and a lens system therein having front and rear lens groups spaced apart longitudinally of the barrel; the improvement which comprises said barrel having an opening extending longitudinally thereof intermediate the lens groups and having a transverse width of substantially 180° of the circumference of the barrel, and a diaphragm unit and an image reversing unit pivotally connected to said barrel exteriorly thereof and adjacent to said opening to be swung selectively and alternately from exteriorly of the barrel into the latter through said opening and located in the optical axis of the lens system intermediate the front and rear lens groups, said diaphragm unit and said image reversing unit being pivotally connected adjacent the longitudinal edges of said opening and at diametrically opposite sides respectively of the barrel and on axes parallel to each other and to the optical axis of the lens system.

7. The improvement defined in claim 6 and wherein said diaphragm unit and said image reversing unit each includes a segmental cover plate acting to close said opening when the respective unit is located within the lens barrel to thus exclude undesired light from the interior of the barrel.

8. The improvement defined in claim 6 and wherein said image reversing unit includes a disk which supports centrally thereof a prism that is located in the optical axis of the lens system when said unit is swung into operative position within the lens barrel.

9. The improvement defined in claim 6 and wherein means is provided for adjusting one of said lens groups along the optical axis of the lens system toward and from the other lens group to vary the nodal point distance and which means includes a segmental slot in said barrel of predetermined length and width and an actuating member extending though said slot to the exterior of said barrel.

References Cited in the file of this patent

UNITED STATES PATENTS

| | | |
|---|---|---|
| 212,099 | Knapp | Feb. 11, 1879 |
| 461,609 | Gundlach | Oct. 20, 1891 |
| 1,394,078 | Frederick | Oct. 18, 1921 |
| 1,688,441 | Stewart | Oct. 23, 1928 |
| 1,878,967 | Mihalyi | Sept. 20, 1932 |
| 2,019,234 | Nistri | Oct. 29, 1935 |
| 2,257,551 | Griffin et al. | Sept. 30, 1941 |
| 2,408,855 | Huebner | Oct. 8, 1946 |
| 2,434,378 | Wekeman | Jan. 13, 1948 |
| 2,470,277 | Wekeman | May 17, 1949 |

FOREIGN PATENTS

| | | |
|---|---|---|
| 313,322 | Great Britain | June 13, 1929 |